United States Patent [19]

Parry et al.

[11] Patent Number: 5,796,215

[45] Date of Patent: Aug. 18, 1998

[54] SOFT START CIRCUIT FOR SELF-OSCILLATING DRIVERS

[75] Inventors: John Edward Parry, Derby, England; Peter N. Wood, Rolling Hills Estates, Calif.

[73] Assignee: International Rectifier Corporation, El Segundo, Calif.

[21] Appl. No.: 671,655

[22] Filed: Jun. 28, 1996

Related U.S. Application Data

[60] Provisional application No. 60/010,720 Jan. 29, 1996.
[51] Int. Cl.$^6$ ...................................................... H05B 37/02
[52] U.S. Cl. .................... 315/224; 315/209 R; 315/272; 315/291; 315/307; 315/DIG. 7
[58] Field of Search ........................... 315/224, 244, 315/209 R, 219, 243, 291, 294, 250, 272, 307, 308, DIG. 4, DIG. 5, DIG. 7

[56] References Cited

U.S. PATENT DOCUMENTS

| | | | |
|---|---|---|---|
| 4,104,715 | 8/1978 | Lawson, Jr. | 363/37 |
| 4,186,434 | 1/1980 | Cowett, Jr. | 363/24 |
| 4,233,558 | 11/1980 | Gaertner | 323/17 |
| 4,277,726 | 7/1981 | Burke | 315/98 |
| 4,560,851 | 12/1985 | Tsukamoto et al. | 219/10.77 |
| 4,682,039 | 7/1987 | Ragle | 250/560 |
| 4,855,649 | 8/1989 | Masaki | 315/310 |
| 4,862,039 | 8/1989 | Kile et al. | 315/194 |
| 4,999,545 | 3/1991 | Summer | 315/219 |
| 5,015,921 | 5/1991 | Carlson et al. | 315/208 |
| 5,030,887 | 7/1991 | Guisinger | 315/158 |
| 5,051,662 | 9/1991 | Counts | 315/247 |
| 5,140,224 | 8/1992 | Kakitani et al. | 315/209 R |
| 5,268,830 | 12/1993 | Loftus, Jr. | 363/17 |
| 5,274,543 | 12/1993 | Loftus, Jr. | 363/127 |
| 5,305,191 | 4/1994 | Loftus, Jr. | 363/17 |
| 5,331,253 | 7/1994 | Counts | 315/209 R |
| 5,363,020 | 11/1994 | Chen et al. | 315/209 R |
| 5,369,340 | 11/1994 | Leyten | 315/307 |
| 5,416,386 | 5/1995 | Nilssen | 315/209 R |
| 5,426,350 | 6/1995 | Lai | 315/244 |
| 5,428,267 | 6/1995 | Peil | 315/224 |
| 5,449,981 | 9/1995 | Auld, Jr. et al. | 315/308 |
| 5,451,841 | 9/1995 | Dunn et al. | 315/97 |
| 5,475,285 | 12/1995 | Konopka | 315/224 |
| 5,477,112 | 12/1995 | Lesea | 315/219 |
| 5,519,289 | 5/1996 | Katyl et al. | 315/224 |
| 5,550,436 | 8/1996 | Houk | 315/209 R |
| 5,612,597 | 3/1997 | Wood | 315/293 |

FOREIGN PATENT DOCUMENTS

| | | |
|---|---|---|
| 2251993 | 7/1992 | United Kingdom. |
| 2287143 | 9/1995 | United Kingdom. |

*Primary Examiner*—Benny Lee
*Assistant Examiner*—Haissa Philogene
*Attorney, Agent, or Firm*—Ostrolenk, Faber, Gerb & Soffen, LLP

[57] ABSTRACT

A half bridge driver chip for driving a resonant load, such as a ballast, has first and second pairs to which an oscillation frequency timing circuit, matched to the resonant frequency of the load. A constant voltage drop circuit is connected to these input pins to vary the voltage at the pins as a linear function of the input voltage $V_{cc}$. Consequently, when $V_{cc}$ is increasing during the start-up of the circuit, the resonant frequency is initially high but decreases to its operation value as $V_{cc}$ increases. This produces a soft start characteristic and a timed preheat cycle of the resonant load. In one embodiment, the constant voltage drop circuit is a zener diode; in another embodiment, it is strings of anti-parallel connected diodes.

19 Claims, 2 Drawing Sheets

FIG. 1
Prior Art
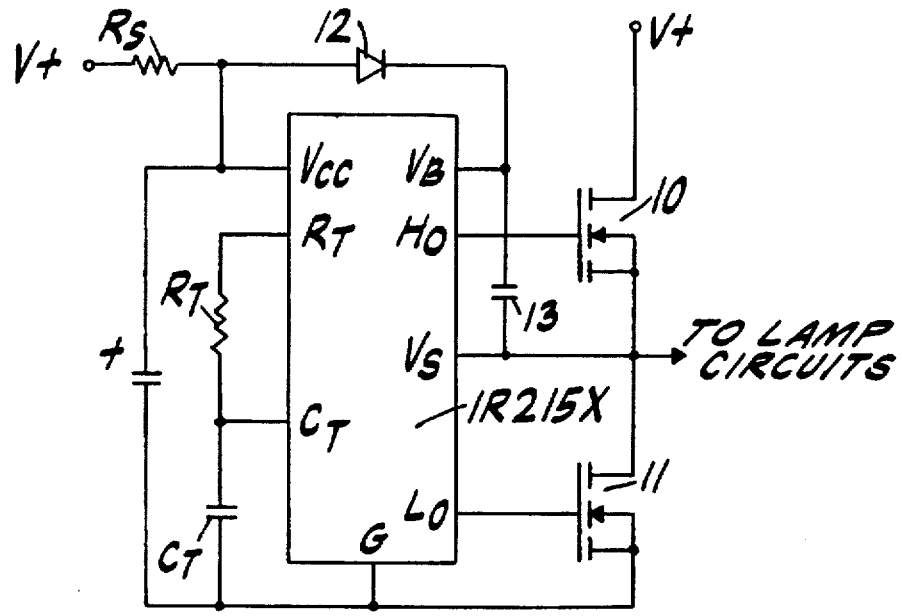
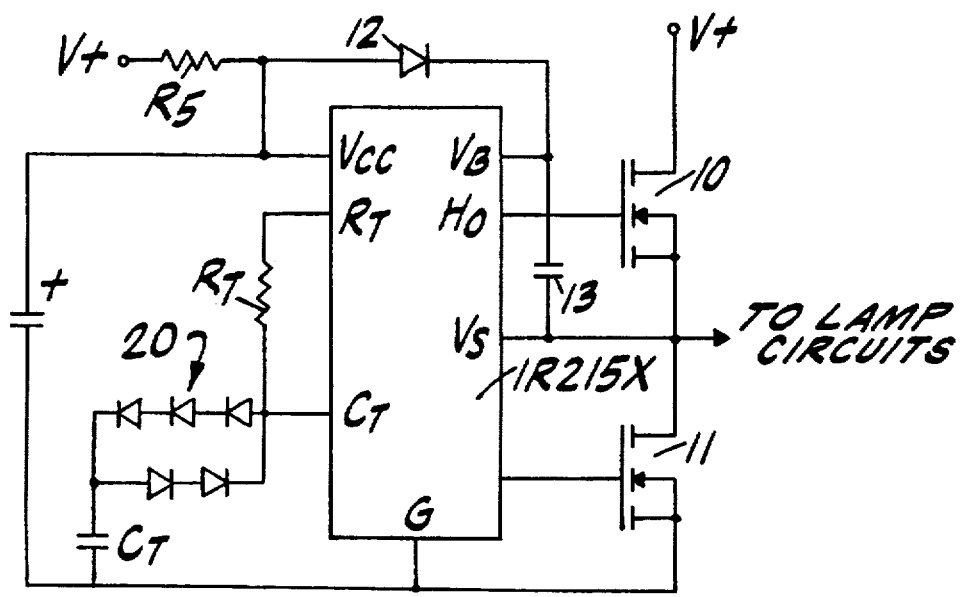
FIG. 2

SOFT START CIRCUIT FOR SELF-OSCILLATING DRIVERS

RELATED APPLICATIONS

This application is related to and claims the filing date of Provisional application Ser. No. 60/010.720. filed Jan. 29, 1996 [IR-1308(PROV)].

1. Field of the Invention

This invention relates to power MOSgate device drivers, and more specifically relates to a self-oscillating driver for a lamp ballast which has soft start characteristics.

2. Background of the Invention

One of the basic limitations of self-oscillating MOSFET drivers such as those of the IR215X and its family of devices sold by the International Rectifier Corporation of El Segundo, Calif., is their inherent constant frequency operation when the $R_T$ and $C_T$ inputs are fixed values.

In a ballast application, this causes a high current demand from MOSFETs connected in a ½ bridge as soon as oscillation commences and after an undervoltage (UV) lockout voltage is exceeded.

In optimized ballast designs where the MOSFETs are selected to provide adequate performance for steady state operation, the additional starting current overstresses the MOSFETs, resulting in a high failure rate.

BRIEF SUMMARY OF THE INVENTION

The circuit of the invention eliminates the above-described problem by soft starting the lamp even after a momentary input power interruption. It further eliminates the need for PTC thermistor-starting circuits with their inherently poor reliability.

The novel circuit produces a significant cost-saving performance enhancement and reduction of component-count over alternative designs for all ballasts using self-oscillating drivers.

BRIEF DESCRIPTION OF THE DRAWINGS

FIG. 1 is a schematic diagram of a prior art ½ bridge ballast circuit for gas discharge lamps, such as fluorescent lamps.

FIG. 2 is a schematic diagram of a circuit of the present invention.

DETAILED DESCRIPTION OF THE PREFERRED EMBODIMENTS

Figure 3:
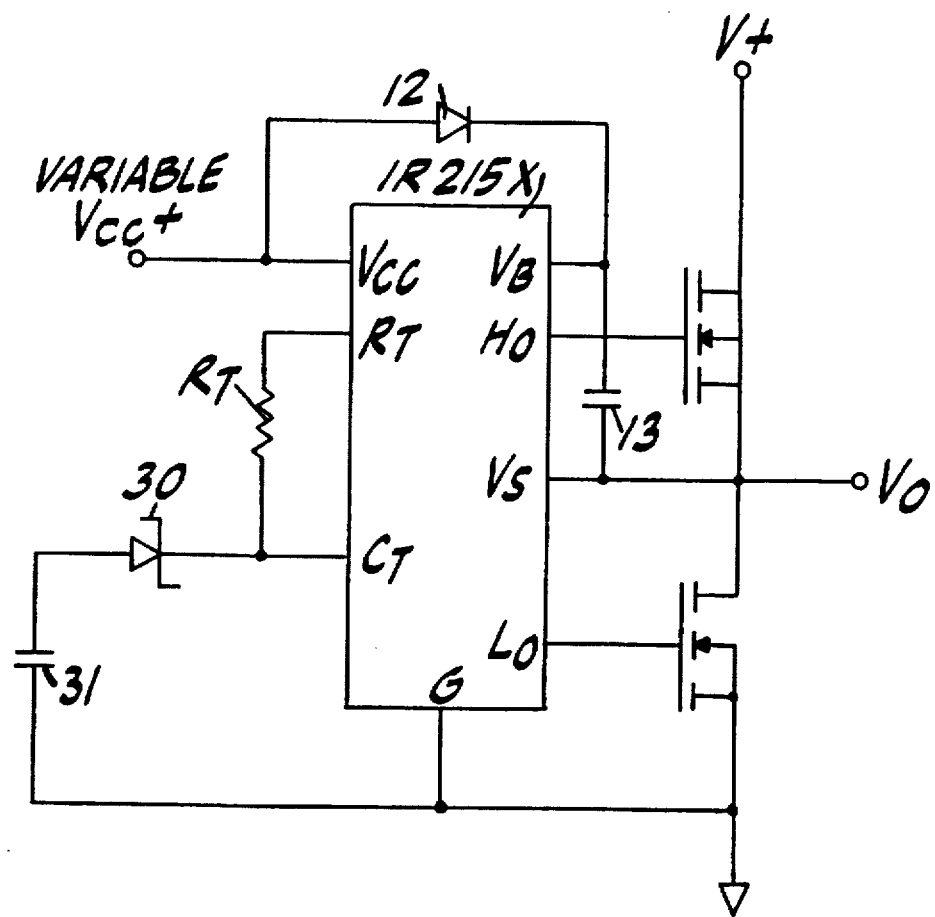
FIG. 3 is a schematic diagram of a second embodiment of the invention.

The circuit of FIG. 1 is a basic known self-oscillating ½ bridge where an output square wave frequency is determined from the values of $R_T$ and $C_T$ connected to chip 10, which is a type IR215X chip. A positive voltage $V_T$ is supplied to pin $V_{CC}$ through a dropping resistor $R_S$. A conventional boot strap circuit consisting of diode 12 and capacitor 13 is provided. As stated above, it is possible for a high starting current to damage power MOSFETs 10 or 11.

In a first embodiment of the invention, the novel soft starting ballast of the invention makes use of a diode array 20, as shown in FIG. 2 to charge and discharge the timing capacitor $C_T$. The array 20 consists of five 1N914 diodes, and capacitor $C_T$ is 0.0022μ. Resistor $R_T$ has a resistance of 24.5 k. In the improved circuit, oscillation starts (as in FIG. 1) as soon as a minimum undervoltage $V_{UV}$ is exceeded. However, because the bi-directional diode array 20 subtracts a portion of the capacitor charging or discharging voltage, the oscillation frequency of $R_T$ and $C_T$ is higher than if no diodes were present.

As $V_{CC}$ increases from $V_{UV}$ to the normal operating voltage, usually from about 9 volts to 15 volts, the diode array 20 subtracts a constant voltage from the $C_T$ charge/discharge voltage. The $C_T$ switching points are ⅓ and ⅔ of $V_{CC}$ which is increasing. Thus the actual $C_T$ switching voltage also increases proportionately. Since the diode array voltage is constant and independent of $V_{CC}$ it follows that the charging and discharging voltages of $C_T$ are not finite ⅓ and ⅔ of $V_{CC}$ but, in fact, as $V_{CC}$ changes, these voltages are a linear function of $V_{CC}$ as described by the equation:

$$f_{osc} \propto 1/V_{cc}+k$$

where k is the undervoltage lockout voltage $V_{UV}$.

In operation, the frequency is high at the start of oscillation and decreases as $V_{CC}$ is raised. The rate at which this process takes place can be used to perform a timed preheat cycle; then a soft lamp start at near resonance; and finally a controlled power level as the final oscillation frequency is reached. Whenever a power interruption causes $V_{CC}$ to be reduced, the soft starting process is repeated.

FIG. 3 shows a second embodiment of the invention, wherein the diodes 20 of FIG. 2 are replaced by a 2 volt zener diode 30 and capacitor 31. A variable positive voltage is then applied to the $V_{CC}$ pin of the IR215X chip. The frequency $f_{OSC}$ can be shown to be proportional to $V_{CC}$ above $V_{uv}$, which is an ideal scenario for a soft start ballast drive circuit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A control circuit for a resonant load to impart soft start characteristics to the resonant load; said control circuit comprising a pair of power MOSFETs connected as a half bridge connected to said resonant load to drive said load at a frequency determined by the frequency at which said power MOSFETs are alternately turned on and off; a source of voltage $V_{cc}$ connected to said pair of power MOSFETs; said control circuit including circuit means having input terminals connected to said source of voltage $V_{cc}$ and output terminals whereby gate turn-on signals are produced at said output terminals and are connected to the gate terminals of said pair of power MOSFETs; the frequency of operation of said output terminals being controlled by an input to said input terminals; and constant voltage means connected to said input terminals for subtracting a constant voltage from the voltage applied to said input terminals, thereby to cause soft start of said circuit as the voltage $V_{cc}$ increases toward its operating value.

2. The control circuit of claim 1 wherein said resonant load is a lamp ballast.

3. The control circuit of claim 1 wherein said constant voltage means comprises a zener diode.

4. The control circuit of claim 1 wherein said constant voltage means comprises at least two strings of diodes in anti-parallel connection with one another.

5. The control circuit of claim 3 wherein said resonant load is a lamp ballast.

6. The control circuit of claim 4 wherein said resonant load is a lamp ballast.

7. The device of claim 1 wherein the voltage at said input terminals changes to produce a frequency of oscillation of said resonant load which is proportional to the inverse of $V_{cc}$ plus a constant.

8. The device of claim 2 wherein the voltage at said input terminals changes to produce a frequency of oscillation of said resonant load which is proportional to the inverse of $V_{cc}$ plus a constant.

9. The device of claim 5 wherein the voltage at said input terminals changes to produce a frequency of oscillation of said resonant load which is proportional to the inverse of $V_{cc}$ plus a constant.

10. The device of claim 6 wherein the voltage at said input terminals changes to produce a frequency of oscillation of said resonant load which is proportional to the inverse of $V_{cc}$ plus a constant.

11. The device of claim 1 wherein said circuit means having input and output terminals is in the family of IR215X integrated circuit chips.

12. The device of claim 11 wherein said input terminals comprise the $R_T$ and $C_T$ terminals of said chip.

13. The device of claim 12 wherein the voltage at said input terminals changes to produce a frequency of oscillation of said resonant load which is proportional to the inverse of $V_{cc}$ plus a constant.

14. The control circuit of claim 13 wherein said resonant load is a lamp ballast.

15. The control circuit of claim 1 further comprising a timing capacitor coupled between said constant voltage means and a ground terminal, and wherein said constant voltage means reduces a voltage stored in said timing capacitor.

16. The control circuit of claim 15, wherein said constant voltage means includes a bidirectionally arranged array of at least two diodes.

17. The control circuit of claim 15, wherein said constant voltage means includes a zener diode.

18. A soft start control circuit comprising: a resonant load circuit; a pair of power mosfets connected to said resonant load circuit to drive said load circuit at a frequency determined by the frequency at which said power mosfets are alternatively turned on and off; a voltage source connected to said pair of power mosfets; circuit means having input terminals connected to said voltage source and output terminals whereby gate turn-on signals are produced at said output terminals and are connected to said gate terminals of said power mosfets; and constant voltage means connected to said input terminals for subtracting a constant voltage from the voltage applied to said input terminals, thereby to cause soft start of said circuit as the voltage increases towards its operating value.

19. The soft start control circuit of claim 18, wherein said voltage means is not directly connected to said resonant load circuit.

* * * * *